Jan. 17, 1939.                  E. MARTIN                    2,144,429
                    ELECTRICAL ENGINE CONTROL MECHANISM
                       Filed July 30, 1936       3 Sheets-Sheet 1
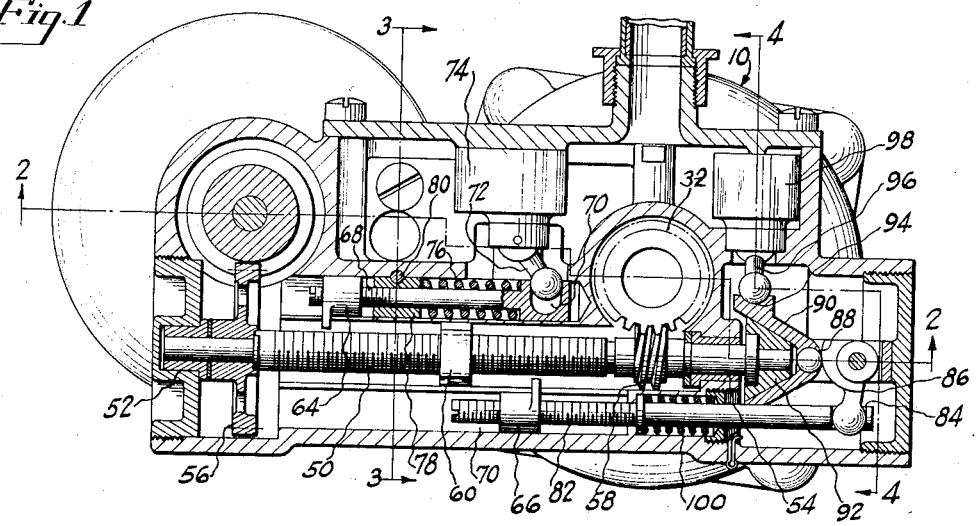
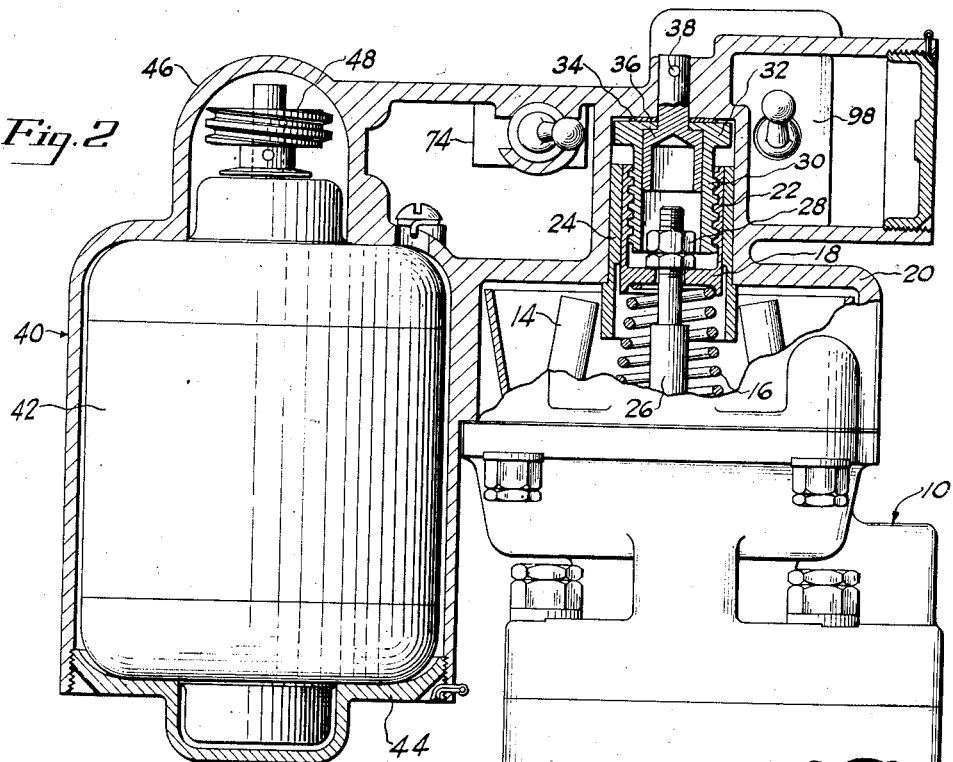
INVENTOR.
Erle Martin
BY Harris G. Luther
ATTORNEY Jan. 17, 1939.                    E. MARTIN                    2,144,429
                    ELECTRICAL ENGINE CONTROL MECHANISM
                    Filed July 30, 1936        3 Sheets-Sheet 2

INVENTOR.
Erle Martin
BY Harris G. Luther
ATTORNEY

Jan. 17, 1939.                    E. MARTIN                    2,144,429
                    ELECTRICAL ENGINE CONTROL MECHANISM
                         Filed July 30, 1936        3 Sheets-Sheet 3
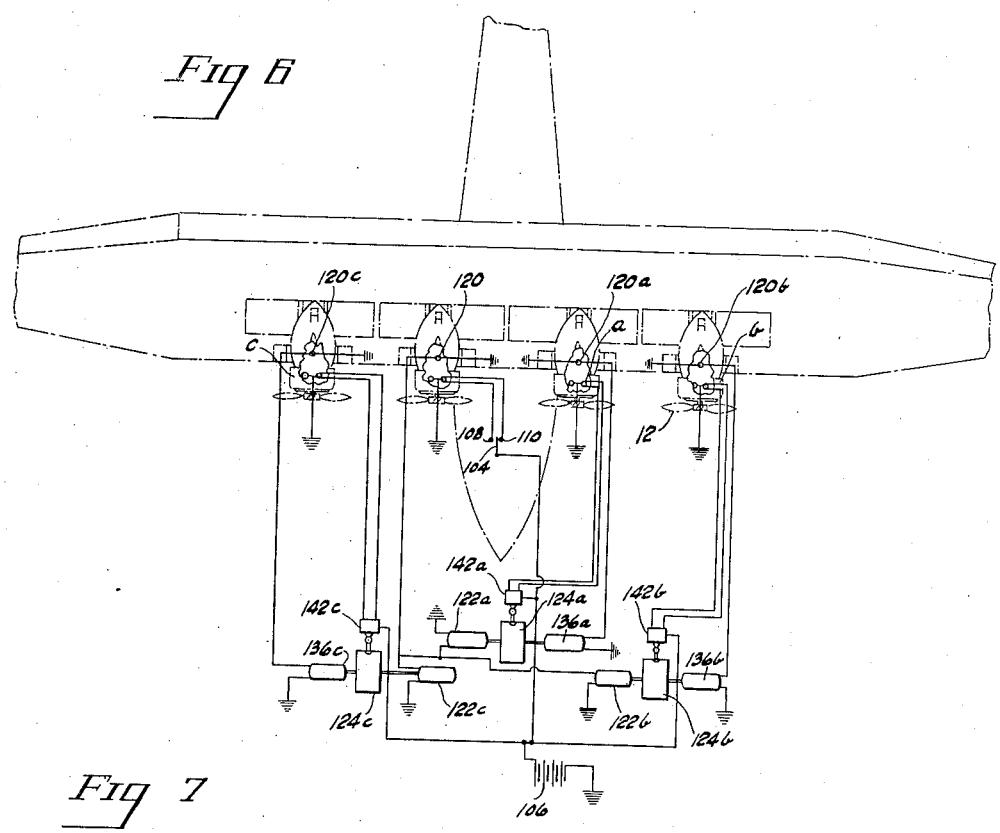
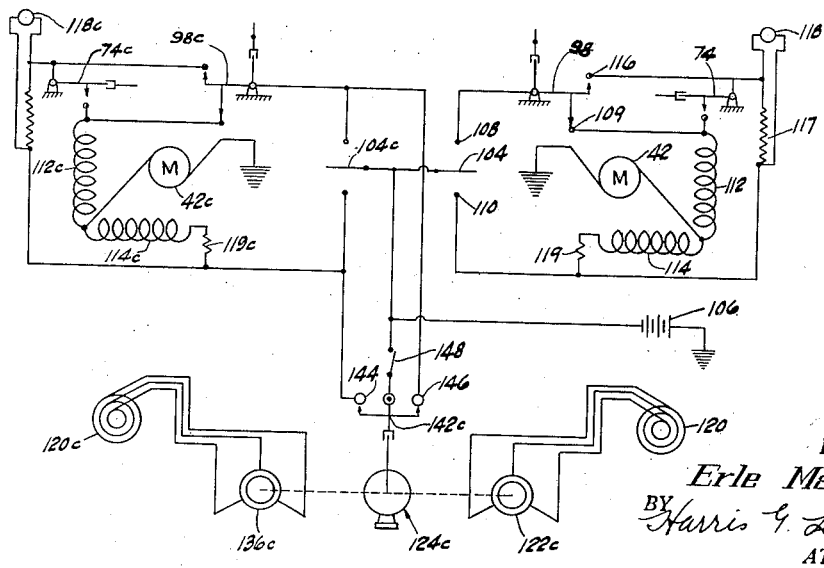
INVENTOR.
Erle Martin
BY Harris G. Luther
ATTORNEY Patented Jan. 17, 1939

2,144,429

UNITED STATES PATENT OFFICE 2,144,429

ELECTRICAL ENGINE CONTROL MECHANISM

Erle Martin, West Hartford, Conn., assignor to United Aircraft Corporation, East Hartford, Conn., a corporation of Delaware Application July 30, 1936, Serial No. 93,530

4 Claims. (Cl. 264—3)

This invention relates to improvements in engine speed controlling means, and has particular application to speed controlling means for use in a power vehicle, such as an airplane.

One of the objects of the invention resides in the provision of manually controllable electrically actuated means for controlling the speed of a vehicle engine or power plant.

A further object resides in the provision of means of the character specified for providing an accurate and sensitive control of the power plant.

An additional object resides in the provision of speed controlling means of the character specified which is light in weight, is simple in construction, and easy to install and maintain.

An additional object resides in the provision of engine speed controlling means of the character specified whereby the speeds of the various engines of a multi-motored vehicle may be synchronized with respect to each other or to the speed of a master engine.

A more particular object resides in the provision of electrically operated means for controlling the speed of an engine by controlling the pitch of a controllable pitch propeller driven by the engine.

Other objects and advantages will be more particularly pointed out hereinafter or will become apparent as the description proceeds.

In the accompanying drawings in which like reference numerals refer to similar parts throughout, there has been illustrated a suitable mechanical embodiment of what is now considered to be the preferred form of the idea of the invention. The drawings, however, are for the purpose of illustration only and are not to be taken as limiting the invention the scope of which is to be measured entirely by the scope of the appended claims.

In the drawings,

Fig. 1 is a horizontal sectional view through a portion of the improved engine speed controlling means, the portion illustrated including a speed governor, a motor, and an operative speed reducing connection between the motor and the governor;

Fig. 2 is a vertical sectional view on the line 2—2 of Fig. 1;

Fig. 6 is a schematic illustration of the application of the idea of the invention to a multi-motored airplane; and Fig. 7 is a schematic illustration of the application of the idea of the invention for synchronizing the speed of a controlled engine with that of a master engine.

Figure 3:
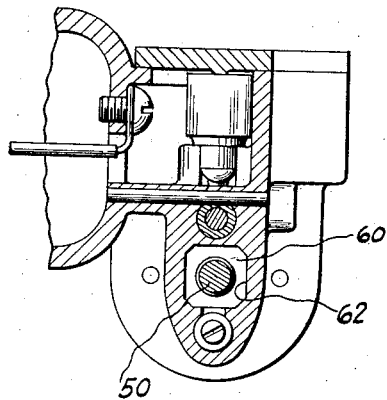
Fig. 3 is a transverse sectional view on the line 3—3 of Fig. 1.

Referring to the drawings in detail, the numeral 10 in Figs. 1 and 2 generally indicates a speed governor of the centrifugally actuated type mounted upon and driven by an engine for controlling the speed of the engine. There is a separate governor for each engine in the case of multi-engine vehicles, and the governor may control the speed of the engine by suitable means, such as by controlling the pitch of a controllable pitch aeronautical propeller, as indicated at 12 in Fig. 6. The particular governor illustrated is arranged to control the pitch of the controllable pitch propeller by controlling the supply of hydraulic fluid to the propeller pitch changing mechanism in a manner well known to the art.

As stated above, the governor 10 is of the centrifugal type and is provided with a pair of flyweights 14 which act under the influence of centrifugal force to vary the valve opening controlling the supply of hydraulic fluid to the propeller. The action of these flyweights is controlled by a coiled compression spring 16 in such manner that the speed of the engine can be controlled by varying the loading or compression upon the speeder spring of the governor.

The lower end of the spring 16 rests upon a movable abutment operatively connected with the flyweights 14 and with the valve controlling the supply of hydraulic fluid to the propeller. The upper end bears against a movable abutment 18 slidably but non-rotatably mounted in an extension of the governor casing 20 above the upper end of the spring. The abutment 18 is cup-shaped and provided with internal screw threads 22 and, if desired, a bushing or sleeve member 24 may be interposed between the abutment member and the casing. The valve stem 26 preferably extends through the closed end of the abutment, and is provided on the side of such closed end opposite the upper end of the spring 16 with a screw threaded nut 28 which limits movement of the stem with respect to the abutment in one direction. A cup-shaped abutment adjusting member 30 provided with external screw threads is threaded into the cup-shaped abutment member 18 and provided at its upper end with a worm gear 32 whereby the adjusting member may be rotated by a suitable mechanism presently to be described. When the abutment adjusting member 30 is rotated, the action of the cooperating screw threads upon the interior of the abutment member 18 and the exterior of the adjusting member 30 serves to move the abutment member with respect to the adjustment member in an axial direction, the abutment member, as stated above, being restrained against rotation by the governor casing or the sleeve 24 in which it is slidably mounted. The adjusting member 30 is restrained against axial movement in a direction to relieve the loading on the spring 16 by means of a thrust bearing 34 disposed between the end of the abutment adjusting member and the adjoining surface of the closed end of the casing extension in which the abutment and the abutment adjusting member are mounted. The abutment adjusting member is preferably journaled upon an axle 36 having an enlarged portion forming a cylindrical bearing within the cylindrical interior of the adjusting member, and a reduced portion received in an aperture extending through the closed end of the casing extension and rigidly retained therein by suitable means, such as the through pin 38.

From this description, it will be observed that rotation of the abutment adjusting member 30 about the axle 36 by means of the worm gear 32 will serve to vary the loading upon the governor spring 16 by changing the axial position of the movable abutment 18 with respect to the axially fixed adjusting member.

The governor casing is provided with a lateral extension, generally indicated at 40, which forms a hollow receptacle for a reversible electric motor 42. The motor is retained in the enclosure and restrained against rotation by means of the screw threaded end closure member 44, and is provided, within a hollow upward extension 46 of the receptacle 40, with a worm 48 mounted upon the motor shaft for rotation therewith.

An externally screw threaded shaft 50, particularly illustrated in Fig. 1, is rotatably mounted in suitable bearings 52 and 54 in the governor casing and is provided at one end with a worm gear 56 meshing with the worm 48 on the motor shaft and at the other end with a worm 58 meshing with the worm gear 32 on the governor spring adjusting member 30 so that rotation of the motor, acting through the worm gear 48, the worm 56, the shaft 50, the worm 58, and the worm gear 32, will impart a rotation to the spring abutment adjusting member 30 at a speed greatly reduced with respect to the speed of the motor. A nut 60 is screw threaded upon the shaft 50 and is slidably but non-rotatably received in a squared channel 62 provided in the governor casing between the motor and the governor, as particularly illustrated in Fig. 3, so that rotation of the shaft 50 by the motor will cause the nut 60 to slide in the channel axially of the shaft 50. Abutments or stop members 64 and 66 are disposed within the casing in a position to be contacted by the nut 60 as it approaches the respective end of its range of movement in the channel 62, the abutment 64 being disposed upon the side of the nut 60 adjacent to the motor, and the abutment 66 being disposed upon the side of the nut 60 remote from the motor.

The stop or abutment 64 is adjustably threaded upon the end of a screw threaded stem 68 which is provided at its end remote from the stop member with a socket 70 which receives the spherical end of a switch toggle lever 72 operatively associated with a limit switch 74. A coiled compression spring 76 is interposed between the end of the stem 68 containing the socket 70 and an apertured sleeve member 78 rigidly secured in the casing by suitable means, such as the through pin 80, and through which the stem 68 slidably extends. The limit switch 74 is connected into the circuit supplying current to the motor 42 in such manner that when the switch is closed by contact of the nut 60 with the abutment 64 the motor will be rendered inoperative to rotate the shaft 50 further in the direction which operates to move the nut 60 toward the abutment 64 by applying current to both sides of the field of the reversible motor. The spring 76 serves to open the switch 74 when the nut 60 has been moved away from the abutment 64 by rotation of the motor in the opposite direction from the direction operative to bring the nut in contact with the abutment. The exact limiting position at which the contact of the nut 60 with the abutment 64 serves to limit the rotation of the motor in the particular direction may be selected by adjusting the position of the stop member 64 upon the screw threaded stems 68.

The abutment 66 is mounted upon a screw threaded stem 82 which is provided at its end remote from the abutment with a socket 84 which receives the spherical end of a cam toggle 86. Actuation of the cam 88 serves to move a clutch member 90 into engagement with a cooperating clutch member 92 secured upon the end of the shaft 50 remote from the motor and beyond the journal bearing 54 from the motor end of the shaft. The clutch member 90 is provided with a socket 94 which receives the spherical end of a switch toggle 96 operatively associated with a limit switch 98 to open and close the switch upon rotation of the clutch member 90.

The limit switch 98 is a double throw switch connected into the circuit supplying energy to the motor in such a manner that when the switch is closed in one direction the governor will be adjusted toward its high speed setting and when the switch is closed in the opposite direction the motor will be rendered inoperative to rotate the shaft 50 in a direction to move the nut 60 in the direction in which it contacts the abutment 66.

Figure 4:
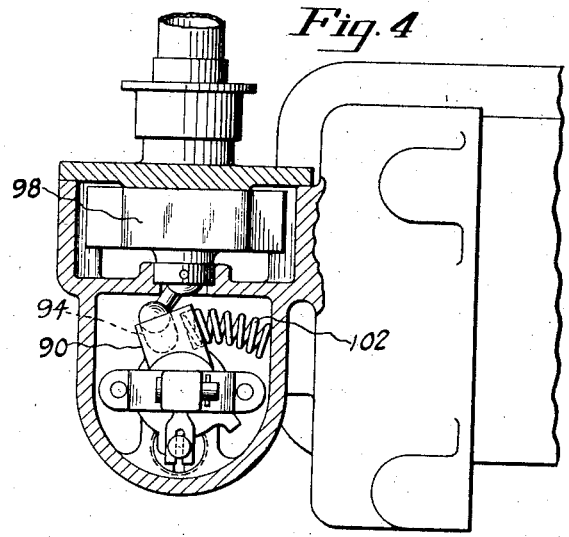
Fig. 4 is a transverse sectional view on the line 4—4 of Fig. 1.

When the nut 60 contacts the abutment 66, the stem 82 is moved in a direction to cause the cam 88 to bear against the end of the clutch member 90 and establish a driving connection between the clutch members 90 and 92, which driving connection serves to rotate the clutch member 90 and operate the switch toggle 96 to close the limit switch 98 so that the motor loses its power when the spring abutment adjusting member 30 has been moved to its limiting position corresponding to the particular direction of rotation of the motor. The limiting position of the abutment adjusting member 30 may be determined by the position of the stop member 66 upon the screw threaded stem 82. A coiled compression spring 100 is provided to return the stem 82 to its original position after the nut 60 has been moved away from contact with the stop 66, to operate the cam 88 and release the driving connection between the clutch members 90 and 92. A further spring 102, particularly illustrated in Fig. 4, is utilized to return the clutch member 90 to its original position and change the limit switch 98 when the driving connection between the clutch members 90 and 92 has been broken.

The two limit switches 74 and 98 are arranged in the circuit in such a manner that current may always be supplied to the motor and so that the motor will be restrained from overrunning the limiting position at either end of the range of adjusting movement. In the embodiment illustrated, the limit switch 98 is used to control the motor at the low pitch or high speed propeller revolution end of the range of adjustment, and the limit switch 74 is used to control the motor at the high pitch or low speed propeller revolution end of the range of adjustment.

A manually operable switch, as indicated schematically at 104 in Fig. 7, is provided to control the motor circuit so that the motor may be operated at will to the limiting position of the parts in either direction of rotation of the motor, the limit switches serving to automatically prevent overrun of the motor past the limiting position at either end of the range of movement of the parts.

As schematically illustrated in Fig. 7, the switch 104 is a double throw switch and is connected at its fixed side with a battery 106 which is grounded upon one side, the motor 42 being shown as also grounded upon one side. While a single wire system having a grounded side has been shown for the purpose of simplicity in the illustration, it is to be understood that a two-wire system is within the scope of the invention and might be considered preferable for use in connection with an internal combustion engine. Current from the battery 106 may be supplied from the switch 104 to either of the contacts 108 or 110 at the will of the operator. If the double throw manual switch 104 is actuated to establish a circuit through the contact 108 and the adjusting mechanism is at some intermediate point in its range of movement so that the limit switch 98 is closed, the current will flow through the contact 109 of the limit switch, through the side 112 of the compound motor field, and through the motor armature to ground, giving to the motor a rotational direction to change the propeller to a flatter pitch and increase the rotational speed of the propeller and its driving engine. When the adjusting mechanism is moved to its limiting flat pitch position, the limit switch 98 is operated thereby to open the contact 109 and close the contact 116. In this condition of the limit switch and with the switch 104 still closed through the contact 108, the current will flow from the contact 108 through the contact 116 of the switch 98, through the resistance 117, and through the side 114 of the compound motor field to ground through the motor armature. This reversing of the motor field will reverse the direction of rotation of the motor and cause a movement of the adjusting mechanism away from the high speed setting. As soon, however, as the adjusting mechanism is moved away from the limiting high speed position, the limit switch will be operated thereby to again reverse the motor the result being that the motor will rotate back and forth within a narrow range of movement of the adjusting mechanism when the adjusting mechanism is at its limiting low pitch or high propeller speed position. The light 118 is connected into the circuit in parallel with the resistance 117 and will be illuminated whenever the limit switch 98 makes contact through the terminal 116. Consequently the signal lamp will blink whenever the motor is in the continuously reversing condition as described above, incident to the approach of the adjusting mechanism to its limiting high speed position. The blinking signal lamp warns the operator that the propeller is in its positive low pitch condition for high speed operation.

Considering now that the adjusting mechanism is at some intermediate point of its range of movement and the manually actuatable double throw switch 104 is operated to establish a circuit through the terminal 110, the current will flow from the battery 106 through the switch 104, directly to the side 114 of the compound motor field through the resistance 119 and to ground through the motor armature. The limit switch 74 being open, the side 112 of the compound motor field is not energized and the motor will rotate in a direction to move the adjusting mechanism toward the setting incident to slow operating speed of the propeller. When the adjusting mechanism has been moved to the limiting low operating speed position, the limit switch 74 will be closed thereby and current, in addition to flowing through the side 114 of the compound motor field, will flow through the resistance 117 and the side 112 of the compound motor field and to ground through the armature. With this condition of the circuit, the effect of the side 112 of the motor field opposes the effect of the side 114 so that the torque of the motor is substantially destroyed and the motor comes to rest as soon after the closing of the limit switch 74 as its momentum is absorbed. When the limit switch 74 is closed, the signal lamp 118 will be continuously illuminated to warn the operator that the adjusting mechanism is in the limiting slow propeller operating speed condition.

The propeller is provided with limit stops in a manner well known to the art to positively determine the opposite ends of the range of pitch changing movement of the propeller blades.

Figure 5:
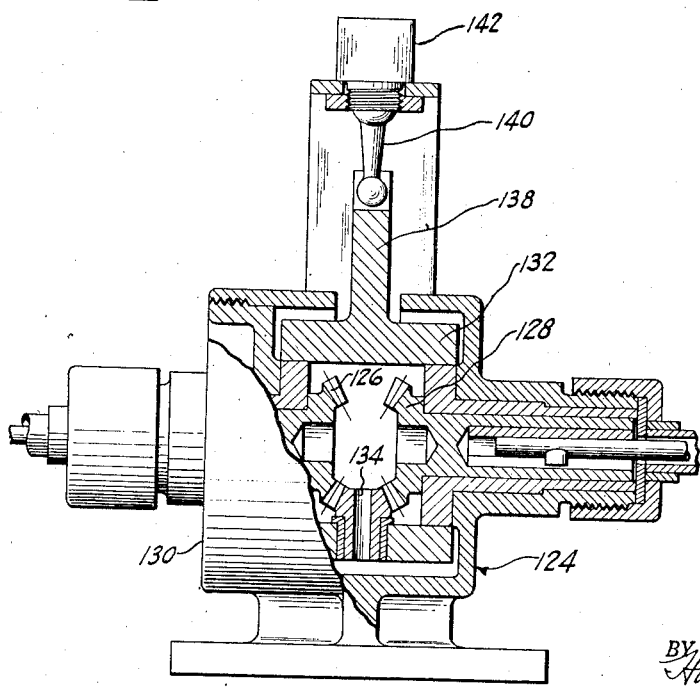
Fig. 5 is an elevational view of a suitable speed difference actuated device for maintaining two engines or power plants in synchronism with each other, a portion being broken away and shown in section to better illustrate the construction thereof.

Figs. 5, 6, and 7 illustrate a suitable combination by means of which the electric engine control may be caused to function to synchronize the speeds of two or more engines when the control is applied to a multi-motored vehicle. As illustrated in Fig. 6, each of the motors may be provided with an alternator, as indicated at 120, 120a, 120b, and 120c, although any other mechanism, such as a commutator, for timing current impulses according to engine speed could be employed. If alternators are used, they may be single phase or split phase alternators, but are preferably three-phase alternators, as indicated in Fig. 7. The current cycle of these alternators, generators, or commutators will be in direct proportion to the speed of the respective engines upon which such impulse timing devices are mounted and by which they are driven. One of the engines, such as the engine upon which the alternator 120 is mounted, may be designated as the master engine, and the other engines, as designated by the letters a, b, and c, may be caused to conform their speeds to the speed of this master engine. As an illustrative example of the application of the device for the purpose of synchronization, as shown in Figs. 6 and 7, the alternator 120 driven by the master engine may be caused to drive a plurality of synchronous motors, indicated at 122a, 122b, and 122c, there being one such synchronous motor for each of the controlled engines a, b, and c. Each of the synchronous motors is operatively connected with a differential mechanism, generally indicated at 124, and particularly illustrated in Fig. 5. It is to be understood, however, that the scope of the invention is not limited to the particular form of speed difference actuated mechanism illustrated, but that various other devices operated upon a difference in the speeds of two current impulse timing devices, may be interposed between the devices driven by the master engine and each of the devices driven by the respective controlled engines to regulate the speeds of the controlled engines in conformity with the speed of the master engine.

In the illustrative form of the invention shown and as explained above, each of the synchronous motors 122a, 122b, and 122c drives one side of a respective differential mechanism 124a, 124b, or 124c. The opposite side of each of the differential mechanisms is driven by a respective synchronous motor 136, indicated in Fig. 6 at 136a, 136b, and 136c, the motors 136 being driven by the alternators 120a, 120b, and 120c driven by the respective controlled engines a, b, and c. Each differential mechanism, as particularly illustrated in Fig. 5, is provided with a pair of beveled gears 126 and 128 rotatably mounted in the casing 130 and facing each other in the interior of the casing. These beveled gears are surrounded by a ring member 132 which carries a plurality of pinion gears 134 meshing with the beveled gears 126 and 128.

From this description, it will be apparent that, as long as the controlled engines are operating at the same speed as the master engine, the current impulses of the alternators 120a, 120b, and 120c will all be timed the same as that of the dynamo 120 driven by the master engine, and consequently the speeds of the synchronous motors 136a, 136b, and 136c will be the same as the speeds of the synchronous motors 122a, 122b, and 122c. As long as the speeds of the synchronous motors 122a and 136a, 122b and 136b, and 122c and 136c, are the same, the respective differential mechanisms 124a, 124b, and 124c will not be actuated, as these mechanisms are dependent for actuation upon a speed difference between the units driving the opposite sides. This result is obtained by driving the beveled gears 126 and 128 in opposite directions so that the pinion gears 134 simply rotate about their own axes without moving the ring 132 as long as the speeds of the gears 126 and 128 are equal and opposite. Upon a variation in the speeds of the driven gears 126 and 128, the faster rotating gear will cause the pinion gears 134 to creep about the slower moving gear, and will consequently cause a displacement of the ring member 132. The ring member 132 is provided with an extension 138 which is operatively engaged with the toggle arm 140 of a switch 142, the respective switches for the various controlled engines being indicated at 142a, 142b, and 142c in Fig. 6.

With the arrangement described above and illustrated in Fig. 6, it will be apparent that upon a variation in the speed of a controlled engine, for example, the engine c, with respect to the reference speed as determined by the master engine, the speed of the synchronous motor 136c will vary with respect to the speed of the synchronous motor 122c driven by the master engine. This variation in the speeds of the synchronous motors 136c and 122c will actuate the differential mechanism 124c to move the double throw switch 142c in one direction or the other depending upon whether the motor 136c leads or lags with respect to the motor 122c.

Referring now to Fig. 7, wherein the synchronizing arrangement is illustrated as applied to the master motor and one of the controlled motors such as the motor c, movement of the switch 142c in one direction by the differential mechanism 124c will cause the switch to close with the contact 144, while movement of the switch 142c in the opposite direction by the differential mechanism will cause the switch to close with the contact 146. When the switch is closed through the contact 144, the current will flow from the battery 106 through this contact 144, the resistance 119c and the side 114c of the governor adjusting motor 42c, causing a rotation of the governor adjusting motor in a direction to adjust the governor of the engine c to bring the speed of that engine back into synchronism with the speed of the master engine. When the switch 142c is closed in the opposite direction, the current will flow from the battery 106 through the contact 146 and the limit switch 74c to the opposite side 112c of the compound field of the motor 42c, thereby causing the motor to rotate in the opposite direction to adjust the governor of the engine c to bring the speed of that engine back into synchronism with the reference speed of the master engine. If desired, suitable switches may be provided whereby any one of the motors of a multi-motored airplane may be selected as the master motor.

The operation of the limit switches and the signal lamp for the propeller adjusting mechanism under the control of the automatic synchronizer is the same as the operation described above for the adjusting mechanism under manual control. The control of the controlled engines a and b may be obtained in the same manner with a duplication of the arrangement illustrated for the control of the engine c.

A manually operable switch 148 is provided in the line between the battery 106 and the speed difference actuated switch 142 of each controlled engine so that the automatic synchronizing control of each one or all of the engines may be discontinued at the will of the operator of the vehicle upon which the engines are mounted. When the switch or switches 148 are opened, the speeds of the various engines may be subjected to manual control through the manually operable switches 104 and 104a, 104b, and 104c in the manner described above in connection with the operation of the master engine by the switch 104.

From the above description, it will be observed that means have been provided for rendering the engine of a single engine airplane subject to manual control through a sensitive, simple, and light weight electrical control mechanism and whereby the engines of a multi-motored airplane may be rendered subject to manual control in the same manner as the engine of a single motored plane or may alternatively be rendered subject to automatic synchronizing action based upon the speed of an engine selected as the master engine.

While a particular form of differential mechanism responsive to differences in speed between the master motor and the controlled motor and operatively connected with the speeder spring of the governor controlling the pitch of the propeller driven by the controlled motor has been illustrated as one operative embodiment of the idea of the invention, it is to be understood that other forms of speed difference responsive devices are within the scope of the invention and that the speed difference responsive mechanism may control the propeller in other ways than by acting upon the governor speeder spring. With a sensitive speed difference responsive device, it would be within the scope of the invention to arrange the device to act directly upon the governor speeder spring without the intervention of the reversible electric motor, and it is also within the scope of the invention to arrange the sensitive speed difference responsive mechanism to directly control the valve regulating the supply of hydraulic fluid to a hydraulically operated controllable pitch propeller, or a switch controlling the supply of electrical energy to an electrically operated propeller. It is also intended to include within the terms disclosing this invention such other arrangements for regulating engine speed by controlling the pitch of controllable pitch propellers, as may be directly suggested to a person skilled in the art by this disclosure.

While there has been illustrated and described a suitable practical application of the idea of the invention, it is to be understood that the invention is not limited to the particular construction so illustrated and described but that such changes in the size, shape, and arrangement of parts and in the substitution of equivalent parts may be resorted to as come within the scope of the appended claims.

Having now described the invention so that others skilled in the art may clearly understand the same, what it is desired to secure by Letters Patent is as follows:

1. Governor regulating means for an engine speed controlling governor comprising, a reversible electric motor, a speed reducing drive between said motor and said governor including a shaft driven at a reduced speed by said motor, a limit switch for limiting the adjustment of said governor by said motor, and a motor driven clutch operatively connected between said shaft and said limit switch to operate said limit switch and serve as a brake for said motor.

2. Governor regulating means for an engine speed controlling governor comprising, a reversible electric motor, a speed reducing power transmitting mechanism between said motor and said governor, a switch for controlling the energization of said motor, and a friction device operatively associated with said mechanism and operative to actuate said switch and act as a brake for said motor.

3. Governor regulating means for an engine speed controlling governor having spring balanced centrifugally acting control means comprising, means for adjusting said spring, said means having an operative range of movement, a reversible electric motor, a speed reducing transmission between said motor and said spring adjusting means, adjustable limit stops to determine the operative range of movement of said spring adjusting means, and motor controlling limit switches operatively associated with said limit stops, one of said limit switches being effective when closed by the associated limit stop to place both sides of the field of said reversible motor in circuit with a source of electrical energy.

4. Governor regulating means for an engine speed controlling governor having spring balanced centrifugally acting control means comprising, means for adjusting said spring said means having an operative range of movement, a reversible electric motor, a speed reducing transmission between said motor and said spring adjusting means, adjustable limit stops to determine the operative range of movement of said spring adjusting means, and motor controlling limit switches operatively associated with said limit stops, to provide a continuous rotation of the motor in an appropriate direction when either switch is closed, one of said limit switches comprising a double throw switch for continuously reversing the direction of rotation of said motor when actuated by the associated limit stop to avoid further adjustment of said spring by said motor by changing the continuous rotation of the motor to an oscillatory rotation within a narrow range.

ERLE MARTIN.